Nov. 15, 1966  S. B. McCLOCKLIN  3,285,268
FLOW DIVIDER VALVE
Filed April 22, 1964
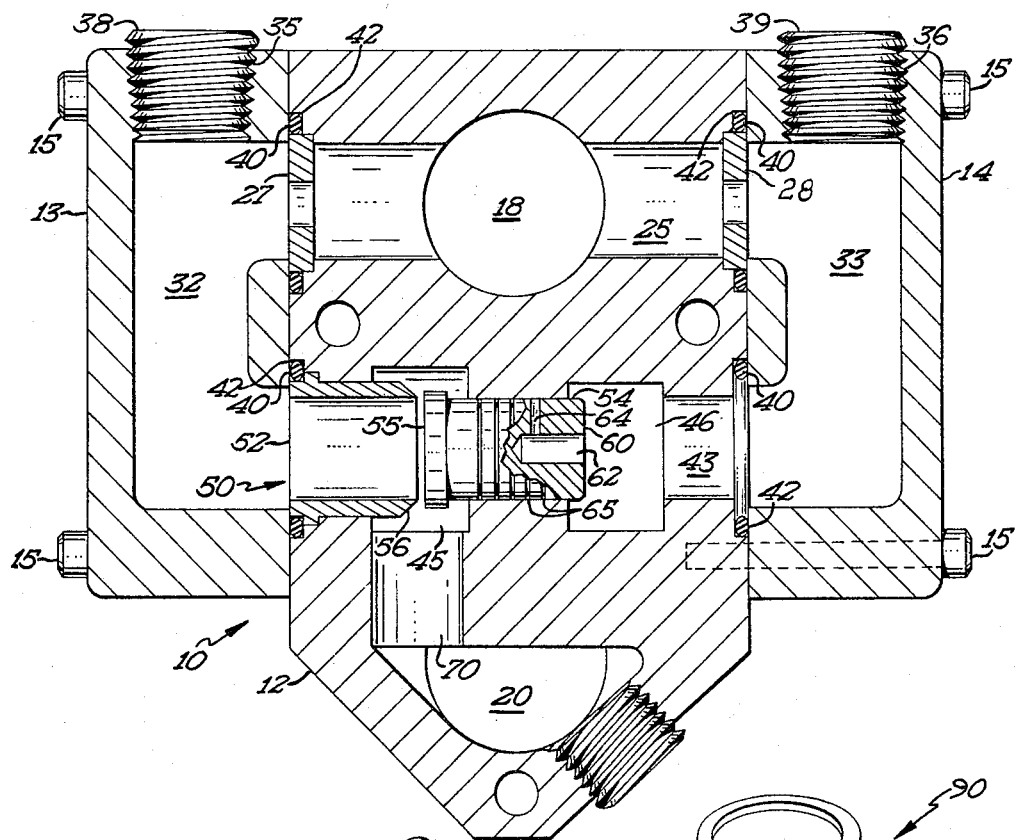
FIG 2
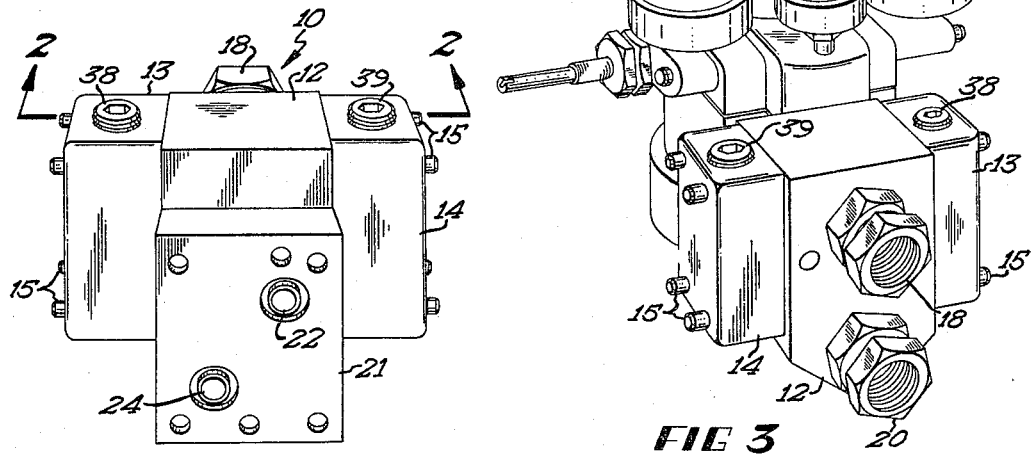
FIG 1
FIG 3
INVENTOR.
SAMUEL B. McCLOCKLIN
BY
Schroeder & Siegfried
ATTORNEYS

United States Patent Office 3,285,268
Patented Nov. 15, 1966

3,285,268
FLOW DIVIDER VALVE
Samuel B. McClocklin, Owatonna, Minn., assignor to The Owatonna Tool Company, Owatonna, Minn., a corporation of Minnesota
Filed Apr. 22, 1964, Ser. No. 361,778
18 Claims. (Cl. 137—115)

My invention relates to flow divider valves and more particulary to an improved flow divider valve or flow proportioning valve which controls flow from a single source through a pair of passages in which one or more of the passages may have differences or variations in loading and resistance to the flow therethrough.

While flow dividing or flow proportioning valves are known and in use, they are generally complex in structure and require a pair of plurality of valves to proportion flow through a plurality of branch passages. With such valve designs, it is not feasible to interchange the ratio between the branch passages and the ratio of flow between the passages is limited by the dead spot between the valves as caused by friction, pressure drops and the like. The present invention is directed to an improved flow proportioning or flow distributing valve which utilizes only a single valve and may be adjusted and modified simply to vary the ratio of flows between the parallel passages within the same. This improved valve is particularly adaptable for use in connection with fluid type test equipment such as hydraulic testers, where the valve permits the use of the tester of a predetermined capacity on subtsantially larger capacity fluid flow lines to give a direct reading of conditions within the lines. Further, the improved valve contains provisions for overcoming hysteresis in the valve, minimizing frictions in the valve and improving operation of the valve in accordance with the flow pressures in the passages to maintain pressures in the passages equal and accurately divide and provide a predetermined ratio of flows between the passages irregardless of loading or of variation in the resistance to flow in one or more of the passages.

It is therefore an object of this invention to provide a simplified flow dividing valve.

Another object of this invention is to provide in a flow dividing valve an arrangement for accurately proportioning flow between a pair of passages through the utilization of a single valve member.

It is also an object of this invention to provide an improved flow dividing valve which automatically controls the division of flow between a pair of passages irrespective of resistance to flow in one or more of the passages.

A further object of this invention is to provide in an improved flow divider valve a simplified valve structure which is economical to manufacture and maintain.

Another object of this invention is to provide an improved flow divider valve which can be readily adapted for different flow ratios between branch passages.

A still further object of this invention is to provide an improved flow dividing valve which includes means for maintaining a constant pressure in the passages of the valve and an accurate division of flow between branch passages with the elimination of hysteresis and frictions in the valve.

These and other objects of this invention will become apparent from a reading of the attached description together with the drawings wherein:

FIGURE 1 is a perspective view of the improved flow divider valve;

FIGURE 2 is a sectional view of the improved flow divider valve taken along the lines 2—2 of FIGURE 1; and FIGURE 3 is a perspective view of the improved flow divider valve with an associated hydraulic tester attached thereto.

The improved flow divider or proportioning valve is shown in FIGURES 1 and 2 as incorporating generally a valve body 10 having a central portion or section 12 and a pair of side portions or sections 13 and 14 which are secured to the central portion through suitable screw means 15. The valve body has a general rectangular configuration and includes on one side surface thereof an inlet port 18 and an outlet port 20 to the flow divider valve. On the opposite side surface of the flow divider valve is a manifold 21 secured to the center portion 12 and having secondary ports 22, 24 thereon by means of which the flow divider valve may be connected to a device adapted to receive a portion of the flow therethrough, as will be later noted.

In FIGURE 2 the body 10 is shown generally in section with the inlet port 18 extending into the body and being connected with a centrally located passage 25 in the central portion 12 of the body. At the ends of the passage 25 are located a pair of orifice members 27, 28 which may be of the same size, that is, may have the same cross sectional area therethrough, or may be of different areas depending upon the desired proportioning or dividing ratio to be obtained from the valve. The orifice members 27, 28 are located adjacent the side portions or sections 13, 14 of the body which have passages 32, 33 therein defining the branch passages of the flow dividing valve. In the case of equal division of flow through the dividing valve, the passages 32, 33 as well as the orifice members 27, 28 will be of the same physical size or cross sectional area. Also included in the side portions or members 13, 14 are passages 35, 36 which are normally provided for cross drilling the passages 32, 33 in the side portion members and are sealed by plug members 38, 39 which may be removable for inspection purposes. O ring or suitable seal members 40 are positioned around the orifices within cooperating annular grooves 42 in the central portion 12 of the body to aid in sealing the orifice members in the central portion when the side portions 13, 14 are secured thereon. Valve body 10 or the central portion 12 thereof includes a lower transversely extending passage 43 having a pair of recessed areas 45, 46 therein. A valve means or valve member 50 having a valve seat 52 and a valve closure member 54 is positioned in passage 43 with the seat in area 45. The valve seat 52 has an internal dimension exposed to the passage 32 which is the same as the diametrical dimension of the main portion of the body of the valve closure member 54. The valve closure member terminates in an annular or cylindrical seating portion 55 which cooperates with the lip of the valve seat, as at 56, which lip is tapered to characterize the flow across the valve seat. Thus the surface of the valve closure member 54 exposed to the flow of fluid past the valve seat 52 is identical with the exposed surface 60 of the valve closure member 54 projecting into the recessed portion 46 of the passage 40 and common with the second branch passage 33. This provides a balanced poppet valve arrangement and the valve closure member 54 is slidably positioned in the portion of the valve body defined by the passage or recess 43 to be moved toward and away from the valve seat 52 in accordance with the pressure differential existing between the passages 32, 33 to establish a pressure in passage 32 equal to that in passage 33 and its effect on the valve closure member 54. The valve closure member 54 also includes a tapped aperture 62 in the surface 60 thereof with a transversely extending passage indicated at 64 leading to the circumferential surface of the valve closure member 54 as it is slidably mounted in the valve body. This surface has a plurality of annular grooves 65 therein which tend to float the valve closure member and eliminate frictions with the valve body. Further, the passages 62, 64 unbalance the valve closure member 54 to dampen hysteresis and noise in the valve.

The recessed area 46 of passage 43 extends through the body of the valve to the secondary outlet port 22 in the manifold 21 of the valve, which outlet port is adapted to be connected to the inlet of the device to be controlled by the divider valve. Similarly, passage 45 or recess 45 beyond the valve 50 is connected to a passage shown in part at 70 leading to the outlet port 20 in the valve body extending to the opposite surface thereof. Thus in the divider valve, the common flow through the inlet port 18 extends through the passage 25 and orifice members 27, 28 to the passages 32, 33. Since the orifices are of the same size, a division is effected in this flow to provide for equal flow for the passages 32, 33. Flow through the passage 33 or the branch passage which is not effected by the valve 50 extends to the outlet port 22 in the valve body or the secondary port leading to the device to be controlled. This fluid flow is exposed to the surface 60 of the valve closure member 54 of the throttling valve 50 so as to impress the pressure of the fluid flow in passage 43 and to the remote device against the valve closure member 54 for control of the positioning of the throttling valve 50. Similarly, the flow through the passage 32 extends through the valve seat 52 of valve 50 to be controlled by the position of the valve closure member 54 with respect to the valve seat 52 and this flow will continue through the divider valve body to the outlet passage 70 leading to the outlet port 20 in the valve body. Under normal circumstances, this flow will return to the reservoir or sump for the hydraulic circuit line or flow line which the divider valve is dividing.

As will be seen in FIGURE 3, a remote device to be controlled by flow through one of the branch passages from a divider valve is physically connected to the divider valve such that the secondary ports 22, 24 therein connect to the inlet and outlet of this device to be controlled. The device, shown generally at 90, represents a hydraulic tester, such as disclosed in my co-pending application, Serial No. 355,049, entitled Hydraulic Circuit Tester, and dated March 26, 1964. It will be understood that any hydraulic tester or loading device may be utilized or may be energized from this divided flow and the details of such a device are omitted herein for simplicity in disclosure. It will be understood, however, that such a device will normally vary or present a resistance to the flow of fluid through this passage in the divider valve such that the pressure in the passage will vary. By variation in this pressure, the valve closure member 54 will be exposed to pressures from passages which will effect an opening or closing of the valve 50 to increase or decrease the pressure through the passage 32 in the divider valve to effect an equalization of pressures and forces on the valve closure member and maintain the division of flow between the branch passages 32, 33 in the divider valve. As will be seen in FIGURE 2, the component parts of the throttling valve 50 are removably positioned in the central portion of the valve body 12 and sealed therein through suitable sealing means such as O rings 40. The side portions 13, 14 of the body structure are secured to the central portion 12 through screws and will clamp the O rings in recesses 42 in the valve body to effect the seal between the side portions and the central portion of the valve body 10 to prevent leakage of fluid at these points. By removal of the side portions, the valve seat 52 may be removed and the valve closure member 54 may be removed from the central portion 12 of the valve body for maintenance purposes.

As was noted in connection with FIGURE 2, the valve seat is tapered, as at 56, and the valve closure member or the sealing portion 52 thereof may be similarly contoured to reverse or modify the direction of flow or the flow vector across the valve seat 52 and thereby vary the force thereon through a change of effective area on the valve closure member. Movement of the valve closure member relative to the valve seat varies the pressure in the passage 32 to equalize the pressures and hence the forces on the valve closure member. With the equal pressures in the passages, the flows through the passages divide in relation to the orifice areas. This insures substantially linear flow in proportion to pressures in the branch passages to insure an equal division of flow through the divider valve.

In providing the secondary passages 22, 24 in the divider valve, the improved divider valve is made readily mountable for use with devices normally energized or operated by a portion of the divided flow. Thus the secondary ports 22, 24 will correspond with the inlet and outlet ports of such a device as the hydraulic tester so that continuous flow through the tester, while being subjected to various loading for test purposes, will be returned through the outlet port of the tester and the outlet or secondary inlet port of the divider valve and will be directed through the divider valve by a passage (not shown) connecting directly with the outlet port 20 and being common in part to the passage 70 leading from the throttling valve 50. This flow will then be returned to the hydraulic circuit or the reservoir portion of the same to provide for a continuous flow through the hydraulic circuit.

The improved flow divider valve is particularly adaptable for use in connection with hydraulic testers when the tester does not have the capacity to completely handle or receive the constant total flow in a hydraulic circuit line in which testing is desired. Under such circumstances, a direct measurement of total flow and all of the characteristics of fluid may be made by attaching a divider valve to the hydraulic tester and directing through the hydraulic tester from the divider valve only a portion or given ratio of the total fluid flowing in the hydraulic circuit line. Thus, in the example given above, where the orifice members 27, 28 are of the same size, the ratio of one to one is obtained in the branch passages 32, 33 so that only one-half of the flow or total flow at the inlet port 18 from the hydraulic circuit will be directed to and through the hydraulic tester. The tester may be calibrated to read the total flow directly and all of the characteristics of the fluid passing through the branch passage 33 may be measured in the hydraulic tester. Variations in the resistance created in the hydraulic tester to simulate loads will be reflected by a change in pressure in the branch passages 33, which in turn will adjust the positioning of the throttle valve 50 to maintain this given ratio of flow between the passages 32, 33. If it is desired to divide the ratio between the passages 32, 33 in other than a one to one ratio, different sized orifice members may be utilized in the flow divider valve to effect such a ratio. Thus by choosing the orifice members having a cross sectional flow area therethrough in a given ratio, a similar ratio of flows through the passages 32, 33 may be effected and the loading portion of the hydraulic circuit, that is, the device taking the flow from the branch passage 33 may receive a portion of the total flow in accordance with this new ratio.

The improved poppet valve acts as a pressure regulating valve to maintain equal pressures in the passages. Subjecting the side surfaces of the poppet valve or valve closure member 54 to the pressure on the end surface or operating surface of the valve closure member 54 substantially dampens hysteresis and floating the valve closure member through the grooves thereon eliminates stickiness in the operation of the valve closure member to provide linear operation of the valve. The fluid pressure directed into the passage in the valve closure member 54 causes an unbalance on the same to eliminate the noise and oscillation caused by hysteresis in the operation of the valve.

It will be recognized that this improved flow divider valve utilizes only a single valve closure member and as such presents a much more simplified structure than conventional prior art devices which perform a similar type function. Further, by utilizing a single valve seat which is characterized, an effective pressure regulator is obtained to insure equal pressures in the passages in the flow divider valve and provides a more linear operating envelope for the valve with increased accuracy in the division of flow.

Therefore, in considering this invention, it should be remembered that the present disclosure is intended to be illustrative only and the scope of the invention should be determined by the appended claims.

What is claimed is:

1. A flow divider valve, comprising:
   (a) a valve body having an inlet port and a pair of outlet ports therein;
   (b) a pair of equal sized passages positioned in said body and connected to said inlet port;
   (c) a pair of orifice means positioned respectively in said passages;
   (d) valve means including a valve seat and a valve closure member having an exposed surface to said valve seat equal to the surface on said valve closure member remote from said valve seat;
   (e) one of said passages in said valve body being connected to one of said outlet ports and including said valve means positioned intermediate the orifice means therein and said one of said outlet ports to control flow therethrough;
   (f) the other of said passages being connected to the other of said outlet ports and including said surface on said valve closure member remote from said valve seat;
   (g) said valve means being positioned by the flow pressure of each of said passages to maintain equal pressures in said passages.

2. The flow divider valve of claim 1 in which the valve means is a balanced poppet valve.

3. The flow divider valve of claim 2 in which the valve means includes characterized cooperating surfaces on said valve seat and said valve closure member to control the flow vector of the flow through said one of said passages and across said valve seat to said one of said outlet ports to vary the effective area on said valve closure member and equalize opposing forces on said valve closure member common to said pair of pasages.

4. The flow divider valve of claim 3 in which the valve seat is mounted in the valve body as a pair of said one of said passages and the valve closure member is slidably positioned in the valve body and projects partially into said one of said passages to cooperate with the valve seat and including means for introducing pressure from said surface of said valve closure member remote from said valve seat around the body of the valve closure member to reduce friction and dampen oscillation of the valve closure member in the valve body.

5. The flow divider valve of claim 4 in which the means for introducing pressure includes a passage from said surface on said valve closure member remote from said valve seat and a plurality of grooves on the surface of said valve closure member slidably positioned in said valve body.

6. The flow divider valve of claim 5 in which the passages in said valve body are formed by removable portions of said valve body to permit removal of the same for removal of said orifice means, the valve seat and the valve closure member therefrom.

7. The flow divider valve of claim 1 in which the orifice means have equal sized cross sectional flow areas therein.

8. The flow divider valve of claim 1 in which the orifice means have different sized cross sectional flow areas to give a ratio of divided flow between the passages in proportion to the rates of the area sizes of said orifice means.

9. A flow divider valve comprising:
   (a) a valve body having an inlet and an outlet port therein and adapted to be connected to a source of fluid under pressure to receive flow therethrough;
   (b) a pair of secondary ports positioned in said valve body remote from said inlet and outlet ports;
   (a) a pair of flow passages in said valve body and connected to said inlet port in said valve body;
   (d) orifice means positioned in each of said passages;
   (e) a valve including a valve seat and a valve closure member having an exposed surface to said valve seat equal in size to the surface of the valve closure member remote from said valve seat;
   (f) one of said passages being connected to said outlet port of said valve body and including said valve positioned intermediate the orifice means and the outlet port to control flow therethrough;
   (g) the other of said passages being connected to one of said secondary ports and including said surface of said valve closure member remote from said valve seat;
   (h) said valve seat and said valve closure member being positioned in said valve body with said valve seat including in said one of said passages and said valve closure member slidably mounted in said valve body intermediate said passages and being exposed in part to said respective passages;
   (i) said valve means being positioned by the pressures applied to the valve closure member from said passages to maintain equal pressures in the passages;
   (j) and additional passages means connecting the other of said secondary ports to said outlet port.

10. A flow divider valve comprising:
    (a) a valve body having an inlet and an outlet port therein and adapted to be connected to a source of fluid under pressure to receive flow therethrough;
    (b) a pair of secondary ports positioned in said valve body remote from said inlet and outlet ports;
    (c) a pair of flow passages in said valve body and connected to said inlet port in said valve body;
    (d) orifice means positioned in each of said passages;
    (e) a valve including a valve seat and a valve closure member having an exposed surface to said valve seat equal in size to the surface of the valve closure member remote from said valve seat;
    (f) one of said passages being connected to said outlet port of said valve body and including said valve positioned intermediate the orifice means and the outlet port to control flow therethrough;
    (g) the other of said passages being connected to one of said secondary ports and including said surface of said valve closure member remote from said valve seat;
    (h) said valve seat and said valve closure member being positioned in said valve body with said valve seat included in said one of said passages and said valve closure member slidably mounted in said valve body intermediate said passages and being exposed in part to said respective passages;
    (i) said valve means being positioned by the flow pressures applied to the valve closure member from said passages to maintain equal pressures in said passages;
    (j) an additional passages means connecting the other of said secondary ports to said outlet port;
    (k) said secondary ports in said valve body permitting the other of said passages to be connected through a remote device to be operated by the divided flow of fluid through said valve body.

11. The flow divider valve of claim 9, and including a responsive means connected to said secondary ports to receive fluid from the other of said passages and return fluid to said valve body and said outlet port, said means being adjustable to vary the pressure of the fluid in the other of said passages.

12. The flow divider valve of claim 11 in which said responsive means is a hydraulic circuit tester.

13. The flow divider of claim 12 in which the orifice means have the same cross sectional flow area therethrough to give an equally divided flow between said passages in the valve body.

14. The flow divider valve of claim 13 in which the orifice means have different sized area openings therein and the ratio of divided flow between the passages is in proportion to the cross sectional areas of the orifice means.

15. A flow proportioning valve, including, a common inlet line, a pair of branch conduits connected in parallel flow relation with each other and in series flow relation with said common inlet line, flow restrictor means included in each of said branch lines, one of said branch lines being adapted to be connected to a remote device to be controlled by flow through said branch line, a pressure responsive throttling valve included in the other of said branch lines having a valve seat and valve closure member exposed to flow in said other of said branch lines and pressure responsive portion exposed to said one of said branch lines, said other of said branch lines being connected beyond said pressure responsive valve to a return line with the flow through said other of said branch lines being proportioned in accordance with flow restrictions by the flow pressures in said branch lines operating on the throttling valve.

16. The flow proportioning valve of claim 15 in which the throttling valve is of the balanced poppet type.

17. The flow proportioning valve of claim 16 in which the valve seat of the throttling valve is tapered to characterize the flow therethrough and vary the effective area on said valve closure member by varying the flow vector of the flow across the valve seat maintain substantially equal pressures from said branch lines applied across the throttling valve.

18. The flow proportioning valve of claim 17 and including passage means connecting said one of said branch lines through the valve closure member of the throttling valve to a surface of the throttling valve remote from said pressure responsive portion and the valve closure portion to dampen hysteresis in the throttling valve.

No references cited.

WILLIAM F. O'DEA, *Primary Examiner.*

H. W. WEAKLEY, *Assistant Examiner.*

UNITED STATES PATENT OFFICE
CERTIFICATE OF CORRECTION

Patent No. 3,285,268

November 15, 1966

Samuel B. McClocklin

It is hereby certified that error appears in the above numbered patent requiring correction and that the said Letters Patent should read as corrected below.

Column 6, line 24, for "including" read -- included --.

Signed and sealed this 12th day of September 1967.

(SEAL)
Attest:

ERNEST W. SWIDER
Attesting Officer

EDWARD J. BRENNER
Commissioner of Patents